(12) United States Patent
Nonokawa et al.

(10) Patent No.: US 9,957,375 B2
(45) Date of Patent: May 1, 2018

(54) RESIN COMPOSITION

(71) Applicants: TEIJIN LIMITED, Osaka-shi, Osaka (JP); WinTech Polymer Ltd., Minato-ku, Tokyo (JP)

(72) Inventors: Ryuji Nonokawa, Matsuyama (JP); Shinichiro Shoji, Iwakuni (JP); Shinya Yamada, Fuji (JP); Kouichi Sakata, Fuji (JP); Kazuya Goshima, Fuji (JP)

(73) Assignees: TEIJIN LIMITED, Osaka (JP); WINTECH POLYMER LTD., Tokyo (JP)

( * ) Notice: Subject to any disclaimer, the term of this patent is extended or adjusted under 35 U.S.C. 154(b) by 0 days. days.

(21) Appl. No.: 14/386,141

(22) PCT Filed: Mar. 15, 2013

(86) PCT No.: PCT/JP2013/058463
§ 371 (c)(1),
(2) Date: Sep. 18, 2014

(87) PCT Pub. No.: WO2013/146625
PCT Pub. Date: Oct. 3, 2013

(65) Prior Publication Data
US 2015/0051324 A1 Feb. 19, 2015

(30) Foreign Application Priority Data

Mar. 27, 2012 (JP) .................. 2012-071626

(51) Int. Cl.
C08K 5/35 (2006.01)
C08K 5/053 (2006.01)
C08K 5/29 (2006.01)
C08J 3/20 (2006.01)

(52) U.S. Cl.
CPC .................. *C08K 5/35* (2013.01); *C08J 3/201* (2013.01); *C08K 5/053* (2013.01); *C08K 5/29* (2013.01); *C08J 2367/02* (2013.01)

(58) Field of Classification Search
CPC ... C08K 5/35; C08K 5/053; C08K 5/29; C08J 3/201
USPC ........................................................ 524/89
See application file for complete search history.

(56) References Cited

U.S. PATENT DOCUMENTS

| 8,592,529 | B2 | 11/2013 | Shoji et al. | |
| 8,816,018 | B2 | 8/2014 | Shoji et al. | |
| 2008/0139715 | A1* | 6/2008 | Scherzer et al. | 524/195 |
| 2011/0114172 | A1 | 5/2011 | Nakada et al. | |
| 2011/0224385 | A1 | 9/2011 | Shoji et al. | |
| 2011/0251384 | A1 | 10/2011 | Shoji et al. | |
| 2012/0184166 | A1 | 7/2012 | Kurihara et al. | |
| 2013/0005875 | A1 | 1/2013 | Shoji et al. | |
| 2013/0079510 | A1 | 3/2013 | Shoji | |

FOREIGN PATENT DOCUMENTS

| JP | 08-073719 A | 3/1996 |
| JP | 3618940 B2 | 2/2005 |
| JP | 2009-138179 A | 6/2009 |
| JP | 2009-155367 A | 7/2009 |
| JP | 2010-285554 A | 12/2010 |
| JP | 2011-127248 A | 6/2011 |
| JP | 2011-127249 A | 6/2011 |
| JP | 2011-225640 A | 11/2011 |
| JP | 2011-241492 A | 12/2011 |
| JP | 2011-251967 A | 12/2011 |
| JP | 2011-256139 A | 12/2011 |
| JP | 2011-256170 A | 12/2011 |
| JP | 5436449 B2 | 3/2014 |
| JP | 5439436 B2 | 3/2014 |
| JP | 5449260 B2 | 3/2014 |
| JP | 5484356 B2 | 5/2014 |
| JP | 5600591 B2 | 10/2014 |
| WO | 2010/018662 A1 | 2/2010 |
| WO | 2010/071211 A1 | 6/2010 |
| WO | 2010/071213 A1 | 6/2010 |
| WO | 2011/155624 A1 | 12/2011 |
| WO | 2009/081571 A1 | 7/2014 |

OTHER PUBLICATIONS

Machine translation of JP 2009-155367. Jul. 2009.*
International Preliminary Report on Patentability dated Oct. 9, 2014, issued by the International Searching Authority in counterpart International application No. PCT/JP2013/058463.
International Search Report for PCT/JP2013/058463 dated Apr. 16, 2013.

* cited by examiner

*Primary Examiner* — John E Uselding
(74) *Attorney, Agent, or Firm* — Sughrue Mion, PLLC

(57) ABSTRACT

A resin composition including an aromatic polyester resin and having high levels of hydrolysis resistance and moldability is provided. The resin composition includes an aromatic polyester resin having a terminal carboxyl group content of not more than 30 eq/ton (component A), a cyclic carbodiimide compound having at least two carbodiimide rings, each having only one carbodiimide group (component B), and a polyvalent hydroxyl group-containing compound having a hydroxyl value of not less than 200 (component C).

9 Claims, No Drawings

RESIN COMPOSITION

CROSS REFERENCE TO RELATED APPLICATIONS

This application is a National Stage of International Application No. PCT/JP2013/058463 filed Mar. 15, 2013 (claiming priority from Japanese Patent Application No. 2012-071626 filed Mar. 27, 2012), the contents of which are incorporated herein by reference in their entirety.

TECHNICAL FIELD

The present invention relates to a resin composition which comprises an aromatic polyester, is excellent in hydrolysis resistance and flowability and suppresses the generation of an isocyanate gas during molding.

BACKGROUND ART

Since aromatic polyester resins typified by polyethylene terephthalate and polybutylene terephthalate have excellent mechanical properties, electrical properties, heat resistance, weatherability, water resistance, chemical resistance, solvent resistance and processability, they are used as engineering plastics in a wide variety of fields such as automobile parts and electric and electronic parts.

Meanwhile, in the automobile field, for the purpose of improving fuel efficiency as one of environmental measures, it is desired to reduce the weights of parts to be mounted on vehicles, and resin parts are becoming thinner and lighter. Importance is now attached to the flowability of a material so that a thin part can be manufactured therefrom. With respect to the quality of each part, the further improvement of mechanical strength such as tensile strength and moist heat stability such as hydrolysis resistance is strongly desired.

In recently years, the aromatic polyester resins have often been used in sheets and films. Especially for photovoltaic power generation (solar cells) application, when an aromatic polyester resin is used as a back sealing film (back sheet film), weatherability and hydrolysis resistance, especially long-term hydrolysis resistance, are required.

Since the aromatic polyester resins are inferior in durability to fluorine-based resins and polyethylene-based resins, various methods for improving durability are proposed.

For example, Patent Documents 1 and 2 disclose that hydrolysis resistance is improved by adding a polycarbodiimide to an aromatic polyester resin.

However, it is known that when a polycarbodiimide compound is used as an end capping agent for a polymer compound, the viscosity of the aromatic polyester resin is greatly increased by a crosslinking reaction with the polyester
(Patent Document 3)

To mold this polyester whose viscosity has been increased, it is necessary to raise the molding temperature. However, when the molding temperature is simply raised, the obtained molded article becomes yellowish, or molding itself become difficult because of the too high temperature should be set.

When a carbodiimide compound is used as an end capping agent for a polymer compound, a compound having an isocyanate group is liberated along with a reaction that the polycarbodiimide compound is bonded to the terminal of the polyester, thereby generating a characteristic to the isocyanate compound odor worsen the work environment.

To solve this problem, there is proposed a resin composition comprising a novel compound having carbodiimide rings, each having only one carbodiimide group (may be referred to as "cyclic carbodiimide compound" hereinafter) as a carbodiimide having a structure that an isocyanate compound is not liberated (Patent Document 4). In this proposal, a resin composition which does not liberate an isocyanate and has a high level of hydrolysis resistance is obtained.

However, when a cyclic carbodiimide compound having at least two carbodiimide rings, each having only one carbodiimide group, is selected from among the above proposed compounds as a thermoplastic aromatic polyester, there arises a new problem that melt viscosity increases as compared with a case where a conventionally known polycarbodiimide compound is used though the degree of improving hydrolysis resistance is high.
(Patent Document 1) JP-A 8-73719
(Patent Document 2) WO2010/018662
(Patent Document 3) Japanese Patent No. 3618940
(Patent Document 4) WO2010/071213

Disclosure of the Invention

It is an object of the present invention to provide a resin composition which solves the potential problems of the above prior art, comprises an aromatic polyester resin and has high levels of hydrolysis resistance and moldability.

In view of the above prior art, the inventors of the present invention studied the use of a cyclic carbodiimide compound having at least two carbodiimide rings, each having only one carbodiimide group, and found that a resin composition which can attain the above object can be obtained by containing an aromatic polyester resin, a cyclic carbodiimide compound and a specific polyvalent hydroxyl group-containing compound. The inventors made further intensive studies and arrived at the present invention.

That is, an object of the present invention is attained by the following invention.

1. A resin composition comprising an aromatic polyester resin having a terminal carboxyl group content of not more than 30 eq/ton (component A), a cyclic carbodiimide compound having at least two carbodiimide rings, each having only one carbodiimide group (component B), and a polyvalent hydroxyl group-containing compound having a hydroxyl value of not less than 200 (component C).
2. The resin composition in the above paragraph 1, wherein the component A contains polybutylene terephthalate in an amount of not less than 50 mass %.
3. The resin composition in the above paragraph 1, wherein the component B is a cyclic carbodiimide compound having a plurality of carbodiimide rings bonded thereto through a spiro bond or a bond group.
4. The resin composition in the above paragraph 1, wherein the component B is a cyclic carbodiimide compound represented by the following formula.

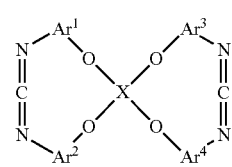

(i)

(In the above formula, X is a tetravalent group represented by the following formula (i-1). Ar¹ to Ar⁴ are each independently an orthophenylene group or 1,2-naphthalene-diyl group which may be substituted by a substituent.)

5. The resin composition in the above paragraph 1, wherein the content of the component B is 0.1 to 3 parts by mass based on 100 parts by mass of the component A.
6. The resin composition in the above paragraph 1, wherein the component C is a polyhydric alcohol or a partial ester thereof.
7. The resin composition in the above paragraph 1, wherein the component C has a hydroxyl value of not more than 1,000.
8. The resin composition in the above paragraph 6, wherein the component C is a partial ester of a polyhydric alcohol and a fatty acid having 12 or more carbon atoms.
9. The resin composition in the above paragraph 1, wherein the content of the component C is 0.05 to 5 parts by mass based on 100 parts by mass of the component A.
10. The resin composition in the above paragraph 1 which has a terminal carboxyl group content of not more than 5 eq/ton.
11. The resin composition in the above paragraph 1 which has a melt viscosity at 280° C. of not more than 300 Pa·s and a reduced viscosity retention of not less than 50% after it is kept for 96 hours in a 121° C., 100% RH (0.2 MPa) pressure cooker test.
12. The resin composition in the above paragraph 2 which has a melt viscosity at 260° C. of not more than 300 Pa·s and a reduced viscosity retention of not less than 80% after it is kept for 100 hours in a 121° C., 100% RH (0.2 MPa) pressure cooker test.
13. A method of producing a resin composition which comprises an aromatic polyester resin having a terminal carboxyl group content of not more than 30 eq/ton (component A), a cyclic carbodiimide compound having at least two rings, each having only one carbodiimide group (component B), and a polyvalent hydroxyl group-containing compound having a hydroxyl value of not less than 200 (component C), comprising the step of:
  (i) melt kneading together the aromatic polyester resin (component A) and the polyvalent hydroxyl group-containing compound (component C) and then adding and melt kneading the cyclic carbodiimide compound (component B) with the obtained mixture; or
  (ii) adding the cyclic carbodiimide compound (component B) and the polyvalent hydroxyl group-containing compound (component C) to the aromatic polyester resin (component A) at the same time and melt kneading them together.
14. A molded article formed form the resin composition of any one of the above paragraphs 1 to 12.

Effect of the Invention

The resin composition of the present invention has high levels of hydrolysis resistance and moldability and rarely generates an isocyanate gas during molding. The resin composition of the present invention can be advantageously used as a material for parts which are exposed to an external environment for a long time, such as back sheets for solar cells and solar cell modules. It can also be advantageously used as a material for thin parts which require flowability at the time of injection molding, such as housings, mechanical parts including wheels and gears, electric and electronic parts including connectors, construction members, civil engineering members, agricultural materials, automobile parts (interior and exterior parts) and parts for daily use.

BEST MODE FOR CARRYING OUT THE INVENTION

The present invention is described in detail hereinunder.
<Aromatic Polyester Resin (Component A)>
The aromatic polyester resin (component A) is a thermoplastic polyester resin obtained through a reaction between a dicarboxylic acid component comprising a dicarboxylic acid compound and/or an ester forming derivative thereof as the main component and a diol component comprising a diol compound and/or an ester forming derivative thereof as the main component and comprises an aromatic compound in at least one of the dicarboxylic acid component and the diol component.
Examples of the dicarboxylic acid component are aliphatic dicarboxylic acids, alicyclic dicarboxylic acids and aromatic dicarboxylic acids.
The aliphatic dicarboxylic acids are aliphatic dicarboxylic acids having 4 to 40 carbon atoms, preferably aliphatic dicarboxylic acids having 4 to 14 carbon atoms, such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimeric acid.
The alicyclic dicarboxylic acids are alicyclic dicarboxylic acids having 4 to 40 carbon atoms, preferably alicyclic dicarboxylic acids having 8 to 12 carbon atoms, such as hexahydrophthalic acid, hexahydroisophthalic acid, hexahydroterephthalic acid and himic acid.
The aromatic dicarboxylic acids are aromatic dicarboxylic acids having 8 to 16 carbon atoms such as phthalic acid, isophthalic acid, terephthalic acid, methylisophthalic acid, methylterephthalic acid, naphthalenedicarboxylic acids including 2,6-naphthalenedicarboxylic acid, 4,4'-biphenyldicarboxylic acid, 4,4'-diphenoxyether dicarboxylic acid, 4,4'-dioxybenzoic acid, 4,'-diphenylmethanedicabroxylic acid and 4,4'-diphenylketone dicarboxylic acid, and derivatives thereof. The derivatives are ester formable derivatives such as lower alkyl esters, aryl esters and acid anhydrides.
These dicarboxylic acid components may be used alone or in combination of two or more. Preferred dicarboxylic acid components are aromatic dicarboxylic acids such as terephthalic acid, isophthalic acid and naphthalenedicarboxylic acids. Terephthalic acid and 2,6-naphthalenedicarboxylic acid are particularly preferred. Preferably, the dicarboxylic acid component contains an aromatic dicarboxylic acid in an amount of not less than 50 mol %, preferably not less than 80 mol % and more preferably not less than 90 mol %. Further, a polycarboxylic acid such as trimellitic acid or pyromellitic acid, or an ester forming derivative thereof (such as an alcohol ester) may be used as required. When this polyfunctional compound is used, a branched thermoplastic polyester resin can be obtained.
Examples of the diol component include aliphatic diols, polyoxyalkylene glycols and alicyclic diols.
The aliphatic diols are aliphatic diols having 2 to 12 carbon atoms, preferably aliphatic diols having 2 to 10 carbon atoms, such as ethylene glycol, trimethylene glycol, propylene glycol, 1,4-butanediol, 1,3-butanediol, neopentyl glycol, hexanediol, octanediol and decanediol.

The polyoxyalkylene glycols are glycols having a plurality of oxyalkylene units whose alkylene group has 2 to 4 carbon atoms. Examples thereof include diethylene glycol, dipropylene glycol, ditetramethylene glycol, triethylene glycol, tripropylene glycol and polytetramethylene glycol.

The alicyclic diols include 1,4-cyclohexanediol, 1,4-cyclohexanedimethanol and hydrogenated bisphenol A.

Aromatic diols such as hydroquinone, resorcinol, bisphenol, 2,2-bis(4-hydroxyphenyl)propane, 2,2-bis-(4-(2-hydroxyethoxyl)phenyl)propane and xylylene glycol may be used in combination with the above diol component.

These diols components may be used alone or in combination of two or more. Preferred diol components are alkylene glycols having 2 to 10 carbon atoms such as ethylene glycol, trimethylene glycol, propylene glycol and 1,4-butanediol.

Preferably, an alkylene glycol having 2 to 10 carbon atoms is contained in the diol component in an amount of not less than 50 mol %, preferably not less than 80 mol % and more preferably not less than 90 mol %. Further, a polyol or an ester forming derivative thereof such as glycerin, trimethylol propane, trimethylol ethane or pentaerythritol may be used as required. When such a polyfunctional compound is used, a branched thermoplastic polyester resin can be obtained.

As the aromatic polyester resin (component A) may be used a copolyester obtained from two or more of the above dicarboxylic acid components and the diol components, or a copolyester obtained from an oxycarboxylic acid component or a lactone component as another copolymerizable monomer (may be referred to as "copolymerizable monomer" hereinafter).

Examples of the oxycarboxylic acid include oxycarboxylic acids such as oxybenzoic acid, oxynaphthoeic acid, hydroxyphenylacetic acid, glycolic acid and oxycaproic acid, and derivatives thereof. Examples of the lactone include lactones having 3 to 12 carbon atoms such as propiolactone, butyrolactone, valerolactone and caprolactone (such as ε-caprolactone).

In the copolyester, the content of the copolymerizable monomer can be selected from a range of 0.01 to 30 mol %, generally 1 to 30 mol %, preferably 3 to 25 mol % and more preferably 5 to 20 mol %. When a homopolyester and a copolyester are used in combination, the content of the copolymerizable monomer is 0.1 to 30 mol % (preferably 1 to 25 mol %, more preferably 5 to 25 mol %) based on the total of all the monomers, and the homopolyester/copolyester ratio can be selected from a range of 99/1 to 1/99 (weight ratio), preferably 95/5 to 5/95 (weight ratio) and more preferably 90/10 to 10/90 (weight ratio).

The preferred aromatic polyester resin (component A) is a homopolyester or a copolyester comprising an alkylene arylate unit such as alkylene terephthalate or alkylene naphthalate as the main component (for example, 50 to 100 mol %, preferably 75 to 100 mol %).

Examples of the polyalkylene terephthalate include polyalkylene terephthalates whose alkylene moiety has 2 to 4 carbon atom, such as polyethylene terephthalate (PET), polytrimethylene terephthalate (PTT) and polybutylene terephthalate (PBT), and 1,4-cyclohexanedimethylene terephthalate (PCT).

Examples of the polyalkylene naphthalate include polyalkylene naphthalates whose alkylene moiety has 2 to 4 carbon atoms, such as polyethylene naphthalate, polypropylene naphthalate and polybutylene naphthalate. They may be used alone or in combination of two or more.

The particularly preferred aromatic polyester resin (component A) is a homopolyester resin or a copolyester resin comprising not less than 80 mol % (specifically not less than 90 mol %) of an alkylene arylate unit whose alkylene moiety has 2 to 4 carbon atoms, such as ethylene terephthalate, trimethylene terephthalate, tetramethylene terephthalate or tetramethylene-2,6-naphthalate. Polyethylene terephthalate resin, polytrimethylene terephthalate resin, polybutylene terephthalate resin and polytetramethylene-2,6-naphthalene dicarboxylate resin are such examples. Out of these, polyethylene terephthalate resin and polybutylene terephthalate resin are preferred, and polybutylene terephthalate resin is particularly preferred.

The aromatic polyester resin (component A) preferably comprises not less than 50 mass % of polybutylene terephthalate.

The terminal carboxyl group content of the aromatic polyester resin (component A) is not more than 30 eq/ton. The terminal carboxyl group content is preferably not more than 25 eq/ton.

According to the present invention, although the hydrolysis resistance of the resin composition can be improved by using the cyclic carbodiimide compound (component B), when the terminal carboxyl group content of the aromatic polyester resin (component A) is too high, the hydrolysis resistance of the resin composition is not fully enhanced. Therefore, the terminal carboxyl group content of the aromatic polyester resin (component A) must be not more than 30 eq/ton.

The intrinsic viscosity (IV) of the aromatic polyester resin (component A) is preferably not less than 0.6 dL/g, more preferably not less than 0.7 dL/g. The above intrinsic viscosity is preferably not more than 1.3 dL/g, more preferably not more than 1.2 dL/g. An intrinsic viscosity of 0.6 to 1.3 dL/g may be achieved by blending together aromatic polyester resins (component A) having different intrinsic viscosities, for example, an aromatic polyester resin having an intrinsic viscosity of 1.5 dL/g and an aromatic polyester resin having an intrinsic viscosity of 0.5 dL/g. The intrinsic viscosity (IV) can be measured at 35° C. in o-chlorophenol or a mixed solvent of phenol and tetrachloroethane (mass ratio of 60/40). When an aromatic polyester resin having an intrinsic viscosity within this range is used, satisfactory hydrolysis resistance can be obtained and the melt viscosity can be reduced efficiently. When the intrinsic viscosity is too low, the effect of improving hydrolysis resistance may not be obtained and when the intrinsic viscosity is too high, melt viscosity at the time of molding becomes high and a flowing failure or a charging failure of the resin may occur in a metal mold.

A commercially available product or what is produced by copolymerizing (polycondensing) a dicarboxylic acid component or a reactive derivative thereof, a diol component or a reactive derivative thereof and optionally a copolymerizable monomer by a commonly used method, for example, transesterification reaction or direct esterification may be used as the aromatic polyester resin (component A).

Preferably, the resin composition of the present invention has a terminal carboxyl group content of not more than 5 eq/ton. Within this range, especially high hydrolysis resistance is obtained. The terminal carboxyl group content is more preferably not more than 3 eq/ton.

Desirably, the resin composition of the present invention has a reduced viscosity retention of not less than 50% after 100 hours in a 121° C., 100% RH (0.2 MPa) pressure cooker test. When the reduced viscosity retention is not less than 50%, the finally obtained film, i.e., a molded article has sufficiently high hydrolysis resistance without greatly reducing its mechanical strength.

The present invention includes a polybutylene terephthalate resin composition which comprises not less than 50 mass % of polybutylene terephthalate based on the total mass of the aromatic polyester resin (component A) and has a melt viscosity at 260° C. of not more than 300 Pa·s and a reduced viscosity retention of not less than 80% after 100 hours in a 121° C., 100% RH (0.2 MPa) pressure cooker test.

In the polybutylene terephthalate resin composition of the present invention, the content of polybutylene terephthalate is not less than 50 mass % based on the total mass of the component A. To obtain the characteristic properties of polybutylene terephthalate, the content of polybutylene terephthalate is preferably not less than 90 mass %, particularly preferably not less than 95 mass % and most preferably not less than 97.5 mass %.

The resin composition of the present invention has a melt viscosity at 260° C. of preferably not more than 1,000 Pa·s, more preferably not more than 300 Pa·s. When the melt viscosity at 260° C. is not more than 1,000 Pa·s, specifically not more than 300 Pa·s, injection molding becomes easy and yellowing does not occur during melt film formation and melt molding.

<Cyclic Carbodiimide Compound (Component B)>

The resin composition of the present invention comprises a cyclic carbodiimide compound (component B) having at least two carbodiimide rings, each having only one carbodiimide group, for the aromatic polyester resin (component A).

In the present invention, the term "carbodiimide ring" means a ring having only one carbodiimide group in a compound whose atoms are bonded together to form a cyclic structure, so-called "cyclic compound". The cyclic carbodiimide compound (component B) as a whole is a compound having at least two carbodiimide rings, each having only one carbodiimide group (—N=C=N—), in one molecule. A compound having this structure has the great effect of improving the moist heat durability of the aromatic polyester resin (component A) and does not generate an isocyanate compound through an end capping reaction.

The number of atoms in the cyclic structure constituting the carbodiimide ring is preferably 8 to 50, more preferably 10 to 30, much more preferably 10 to 20 and particularly preferably 10 to 15.

The number of atoms in the cyclic structure means the number of atoms constituting the cyclic structure directly. For example, the number of atoms of an 8-membered ring is 8, and the number of atoms of a 50-membered ring is 50. When the number of atoms in the cyclic structure is 8 or more, the stability of the cyclic carbodiimide compound (component B) is high, whereby it is easy to store and use it. From the viewpoint of reactivity, the upper limit of the number of ring members is not particularly limited but a cyclic carbodiimide compound having 50 or less atoms (component B) is easily synthesized, thereby making it possible to suppress a rise in cost.

The molecular weight of the cyclic carbodiimide compound (component B) is preferably 100 to 1,000. Above 100, the structural stability and volatility of the cyclic carbodiimide compound (component B) become advantageous. Below 1,000, synthesis in a dilution system is not required in the production of a cyclic carbodiimide and the yield hardly lowers, all which are advantageous in terms of cost. From the above points of view, the molecular weight is more preferably 100 to 750, much more preferably 250 to 750. The molecular weight of the cyclic carbodiimide compound (component B) means weight average molecular weight when the cyclic carbodiimide compound (component B) has a molecular weight distribution.

The component B is preferably a cyclic carbodiimide compound whose carbodiimide rings are bonded together through a spiro bond or a bond group. When the cyclic carbodiimide compound takes this structure, the effect of improving the moist heat durability of the aromatic polyester resin (component A) can be further enhanced.

The component B is particularly preferably a compound represented by the following formula.

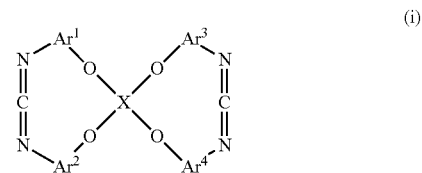

(In the above formula, X is a tetravalent group represented by the following formula (i-1). $Ar^1$ to $Ar^4$ are each independently an orthophenylene group or 1,2-naphthalene-diyl group which may be substituted by a substituent.)

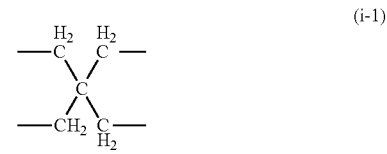

The following compounds are examples of the cyclic carbodiimide compound (component B) having at least two carbodiimide rings, each having only one carbodiimide group, which can be used in the present invention.

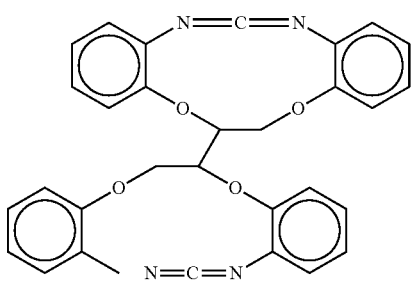

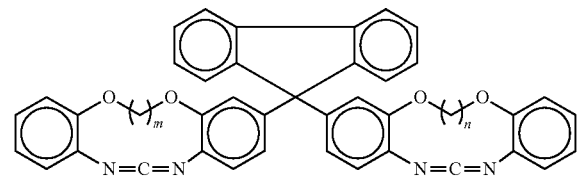

"m" and "n" are each an integer of 1 to 6.

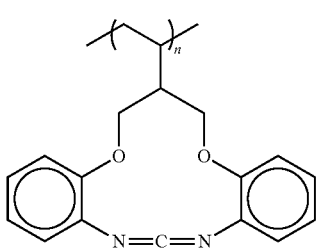

(When a cyclic carbodiimide compound is added to the main chain of a polymer, "n" is the number of recurring units of the polymer.)

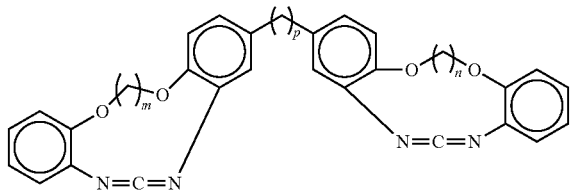

("p", "m" and "n" are each an integer of 1 to 6.)

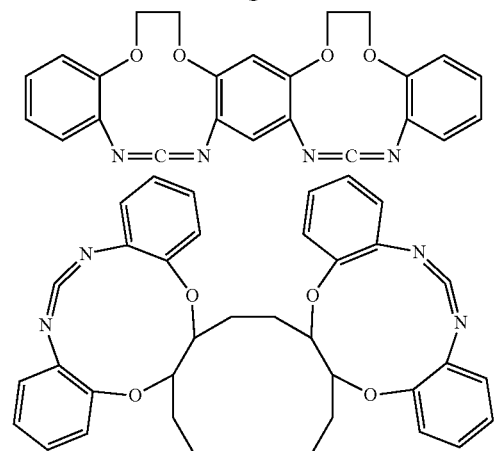

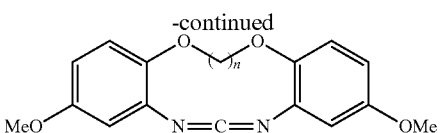

-continued ("n" is an integer of 1 to 6.)

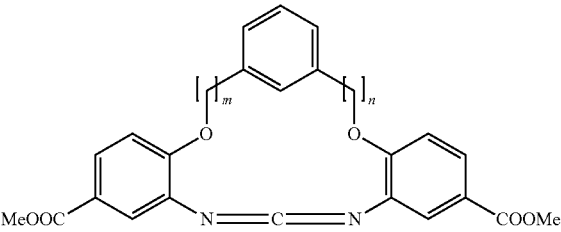

("m" is an integer of 0 to 3, and "n" is an integer of 0 to 3.

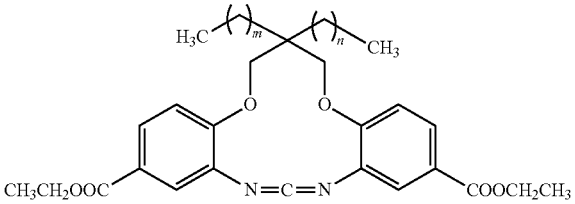

("m" is an integer of 0 to 5, and "n" is an integer of 0 to 5.)

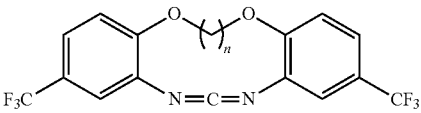

("n" is an integer of 1 to 6.)

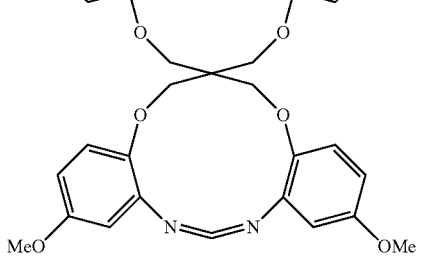

These compounds can be produced based on the disclosures of WO2010/071211 and JP-A 2011-256139.

The content of the cyclic carbodiimide compound (component B) in the resin composition is preferably 0.1 to 3 parts by mass, more preferably 0.3 to 2 parts by mass and much more preferably 0.5 to 1.5 parts by mass based on 100 parts by mass of the aromatic polyester resin (component A).

When the content of the component B falls within the above range, the effect of the carbodiimide can be obtained without denaturing the properties of the substrate.

<Polyvalent Hydroxyl Group-Containing Compound (Component C)>

The polyvalent hydroxyl group-containing compound (component C) is a compound having at least two hydroxyl groups in one molecule. The polyvalent hydroxyl group-containing compound (component C) has a hydroxyl value of not less than 200 as will be described hereinafter. The polyvalent hydroxyl group-containing compounds (component C) having a hydroxyl value of not less than 200 may be used alone or in combination of two or more.

This polyvalent hydroxyl group-containing compound (component C) enhances the flowability of the resin composition. In general, although flowability can be improved when a component which enhances flowability is added to an aromatic polyester resin, it is impossible to avoid the deterioration of the characteristic properties such as mechanical strength and toughness of the aromatic polyester resin. However, by using the polyvalent hydroxyl group-containing compound (component C) having a hydroxyl value of not less than 200, the flowability of the resin composition at the time of melting can be improved efficiently while the characteristic properties of the aromatic polyester resin are maintained at high levels.

The polyvalent hydroxyl group-containing compound (component C) having a hydroxyl value of not less than 200 also serves as a hydrolysis resistance accelerating aid which promotes the component B's effect of improving the hydrolysis resistance of the resin composition in the resin composition comprising the cyclic carbodiimide compound (component B). Although the cause of this is not identified, it is assumed that the polyvalent hydroxyl group-containing compound (component C) having a hydroxyl value of not less than 200 suppresses a rise in the viscosity of the resin composition to improve melt kneadability, whereby a reaction between the aromatic polyester resin (component A) and the cyclic carbodiimide compound (component B) is carried out efficiently.

Therefore, when the polyvalent hydroxyl group-containing compound (component C) having a hydroxyl value of not less than 200 is contained in the resin composition, use is made of the characteristic properties of the aromatic polyester resin (component A), and the hydrolysis resistance of the resin composition can be improved while the flowability of the resin composition is enhanced.

What is produced by a conventionally known method may be used or a commercially available product may be purchased and used as the polyvalent hydroxyl group-containing compound (component C) having a hydroxyl value of not less than 200.

The hydroxyl value of the polyvalent hydroxyl group-containing compound (component C) is not less than 200. The preferred hydroxyl value is not less than 250. When the above hydroxyl value is not less than 200, the above flowability improving effect tends to be enhanced.

Meanwhile, the hydroxyl value of the polyvalent hydroxyl group-containing compound (component C) is preferably not more than 1,000, more preferably not more than 800, much more preferably not more than 600 and particularly preferably not more than 500. When the above hydroxyl value is not more than 1,000, a further effect that the occurrence of a mold deposit can be effectively suppressed at the time of molding the obtained resin composition can be obtained.

In addition, since a reaction between the polyvalent hydroxyl group-containing compound (component C) and the aromatic polyester resin (component A) is prevented from proceeding excessively, the molecular weight of the aromatic polyester resin (component A) hardly drops and the characteristic properties such as mechanical properties, hydrolysis resistance, heat resistance and chemical resistance of the aromatic polyester resin (component A) tend to be retained.

In the present application, the hydroxyl value is measured by JOCS method 2.3.6.2-1996 (pyridine/acetic anhydride method) (The JOCS Standard Methods for the Analysis of Fats, Oils and Related Materials).

Examples of the polyvalent hydroxyl group-containing compound (component C) include polyhydric alcohols and partial esters thereof. The component C is preferably a partial ester of a polyhydric alcohol and a fatty acid having 12 or more carbon atoms.

The polyhydric alcohol is, for example, a compound having at least two hydroxymethyl groups in the same molecule. Examples thereof include ethylene glycol, propylene glycol, 1,3-propanediol, 1,4-butanediol, 1,6-hexanediol, diethylene glycol, polyethylene glycol, polypropylene glycol, polytetramethylene glycol, trimethylol methane, pentaerythritol, dipentaerythritol, tripentaeryhtritol and sorbitols. At least one selected from these is preferably used, and they may be used alone or in combination of two or more.

Preferably, the fatty acid of a partial ester of a polyhydric alcohol has 12 or more carbon atoms from the viewpoint of flowability. Examples of the fatty acid having 12 or more carbon atoms include lauric acid, oleic acid, palmitic acid, stearic acid, 12-hydroxystearic acid, behenic acid and montanic acid. The fatty acid is preferably a fatty acid having 12 to 32 carbon atoms, particularly preferably a fatty acid having 12 to 22 carbon atoms. More specifically, lauric acid, stearic acid, 12-hydroxystearic acid and behenic acid are particularly preferred. By using a fatty acid having 12 or more carbon atoms, the heat resistance of the resin tends to be fully retained advantageously. When the number of carbon atoms is 32 or less, the above flowability improving effect becomes high advantageously.

To provide flowability at the time of melting to the resin composition and ensure the obtained molded body to retain almost all the physical properties of the aromatic polyester resin (component A) without deteriorating them, a glycerin fatty acid ester or an ether obtained by addition polymerizing alkylene oxide with diglycerin is preferred as the polyvalent hydroxyl group-containing compound (component C).

A description is subsequently given of the ether obtained by addition polymerizing alkylene oxide with a glycerin fatty acid ester or diglycerin. The glycerin fatty acid ester is an ester comprising glycerin and/or a dehydration condensate thereof and a fatty acid.

Glycerin fatty acid esters obtained by using a fatty acid having 12 or more carbon atoms are preferred. The fatty acids having 12 or more carbon atoms include lauric acid, oleic acid, palmitic acid, stearic acid, 12-hydroxystearic acid, behenic acid and montanic acid. Fatty acids having 12 to 32 carbon atoms are preferred, and fatty acids having 12 to 22 carbon atoms are particularly preferred.

Preferred examples of the glycerin fatty acid ester include glycerin monostearate, glycerin monobehenate, diglycerin monostearate, triglycerin monostearate, triglycerin stearic acid partial ester, tetraglycerin stearic acid partial ester, decaglycerin lauric acid partial ester and glycerin mono 12-hydroxy stearate.

The ether obtained by addition polymerizing alkylene oxide with diglycerin is, for example, polyoxypropylene diglyceryl ether obtained by addition polymerizing propylene oxide with diglycerin, or polyoxyethylene diglyceryl ether obtained by addition polymerizing ethylene oxide with diglycerin. In the present invention, out of these ethers, polyoxyethylene diglyceryl ether is particularly preferably used.

The content of the polyvalent hydroxyl group-containing compound (component C) in the resin composition is preferably 0.05 to 5 parts by mass, more preferably 0.1 to 3 parts by mass and more preferably 0.5 to 2 parts by mass based on 100 parts by mass of the aromatic polyester resin (component A). When the content of the polyvalent hydroxyl group-containing compound is not less than 0.05 part by mass, the flowability improving effect tends to be fully obtained advantageously and when the content is not more than 5 parts by mass, the poor appearance of a molded article and the contamination of a mold by gas production during molding rarely occur advantageously.

<Production Process of Resin Composition>

The resin composition of the present invention may be produced by melt kneading together the aromatic polyester resin (component A), the cyclic carbodiimide compound (component B) and the polyvalent hydroxyl group-containing compound (component C).

The timing of adding the polyvalent hydroxyl group-containing compound (component C) to the system is important. When the polyvalent hydroxyl group-containing compound having a hydroxyl value of not less than 200 (component C) is not added before the carbodiimide compound (component B) is added to the aromatic polyester resin (component A), thickening occurs by the carbodiimide compound (component B) before a thickening prevention effect is obtained by adding the component C, thereby making it difficult to obtain the resin composition of the present invention if the component C is added after the addition of the component B.

Therefore, (I) the carbodiimide compound (component B) should be added and melt kneaded in the coexistence of the aromatic polyester resin (component A) and the polyvalent hydroxyl group-containing compound (component C), or (II) the polyvalent hydroxyl group-containing compound (component C) and the carbodiimide compound (component B) should be added to and melt kneaded with the aromatic polyester resin (component A) at the same time.

In the case of the above (I), when the aromatic polyester resin (component A) and the polyvalent hydroxyl group-containing compound (component C) are made coexistent, before the addition of the carbodiimide compound (component B), they are preferably melt kneaded together to disperse the component C.

A kneading method in a molten state is preferred from the viewpoints of productivity and homogeneous kneadability. The kneading apparatus is not particularly limited, and conventionally known vertical reactors, mixing tanks, kneading tanks, or single-screw or multi-screw horizontal kneaders such as single-screw or multi-screw extruders or kneaders are used. The melt kneading time is not particularly specified and 0.1 minute to 2 hours, preferably 0.2 to 60 minutes and more preferably 0.2 to 30 minutes though this depends on the mixing apparatus and the mixing temperature.

The capping reaction of the carboxyl group of the aromatic polyester resin by the cyclic carbodiimide compound (component B) can be carried out at room temperature (25° C.) to 300° C., preferably 50 to 280° C. from the viewpoint of reaction efficiency and more preferably 100 to 280° C. as the reaction is more promoted.

The aromatic polyester resin (component A) is preferably reacted at a temperature lower than 300° C. in order to suppress the volatilization and decomposition of the cyclic carbodiimide compound (component B) though the reaction tends to proceed at a temperature at which the aromatic polyester resin is molten. The use of a solvent is effective in reducing the melting temperature of the aromatic polyester resin (component A) and increasing the stirring efficiency.

Although the capping reaction proceeds swiftly without a catalyst, a catalyst for promoting the capping reaction may be used. Catalysts which are used to carry out a capping reaction by using a conventional linear carbodiimide compound may be used as the catalyst. They may be used alone or in combination of two or more. The amount of the catalyst is not particularly limited but preferably 0.001 to 1 part by mass, more preferably 0.01 to 0.1 part by mass and much more preferably 0.02 to 0.1 part by mass based on 100 parts by mass of the total of the thermoplastic aromatic polyester and the cyclic carbodiimide.

<Stabilizer>

The resin composition of the present invention may comprise a stabilizer. Stabilizers which are used for ordinary thermoplastic resins may be used as the stabilizer. Examples thereof include antioxidants and light stabilizers. By blending these, molded articles which are excellent in mechanical properties, moldability, heat resistance and durability can be obtained.

The antioxidants include hindered phenol-based compounds, hindered amine-based compounds, phosphorus-based compounds such as phosphite-based compounds and thioether-based compounds.

The hindered phenol-based compounds include n-octadecyl-3-(3',5'-di-tert-butyl-4'-hydroxyphenyl)-propionate, n-octadecyl-3-(3'-methyl-5'-tert-butyl-4'-hydroxyphenyl)-propionate, n-tetradecyl-3-(3',5'-di-tert-butyl-4'-hydroxyphenyl)-propionate, 1,6-hexanediol-bis[3-(3,5-di-tert-butyl-4-hydroxyphenyl)-propionate], 1,4-butanediol-bis[3-(3,5-di-tert-butyl-4-hydroxyphenyl)-propionate], 2,2'-methylene-bis(4-methyl-tert-butylphenol), triethylene glycol-bis[3-β-tert-butyl-5-methyl-4-hydroxyphenyl)-propionate], tetrakis[methylene-3-(3',5'-di-tert-butyl-4-hydroxyphenyl)propionate]methane and 3,9-bis[2-{3-β-tert-butyl-4-hydroxy-5-methylphenyl)propionyloxy}-1,1-dimethylethyl)2,4,8,10-tetraoxaspiro(5,5)undecane.

The hindered amine-based compounds include N,N'-bis-3-(3',5'-di-tert-butyl-4'-hydroxyphenyl) propionyl hexamethylenediamine, N,N'-tetramethylene-bis[3-(3'-methyl-5'-tert-butyl-4'-hydroxyphenyl)propionyl]diamine, N,N'-bis[3-(3,5-di-tert-butyl-4-hydroxyphenyl)-propionyl]hydrazine, N-salicyloyl-N'-salicylidene hydrazine, 3-(N-salicyloyl) amino-1,2,4-triazole and N,N'-bis[2-{3-(3,5-di-tert-butyl-4-hydroxyphenyl) propionyloxy}ethyl]oxyamide. Out of these, triethylene glycol-bis[3-β-tert-butyl-5-methyl-4-hydroxyphenyl)-propionate] and tetrakis[methylene-3-(3',5'-di-tert-butyl-4-hydroxyphenyl)propionate]methane are preferred.

The phosphite-based compounds are preferably compounds having at least one P—O bond bonded to an aromatic group, such as tris(2,6-di-tert-butylphenyl)phosphite, tetrakis(2,6-di-tert-butylphenyl)4,4'-biphenylene phosphite, bis(2,6-di-tert-butyl-4-methylphenyl)pentaerythritol-diphosphite, 2,2-methylenebis(4,6-di-tert-butylphenyl)octyl phosphite, 4,4'-butylidene-bisβ-methyl-6-tert-butylphenyl-di-tridecyl)phosphite, 1,1,3-tris(2-methyl-4-ditridecylphosphite-5-tert-butylphenyl)butane, tris(mixed mono- and dinonylphenyl)phosphites, tris(nonyl)phosphite and 4,4'-isopropylidenebis(phenyl-dialkylphosphite).

Out of these, tris(2,6-di-tert-butylphenyl)phosphite, 2,2-methylenebis(4,6-di-tert-butylphenyl)octyl phosphite, bis(2,6-di-tert-butyl-4-methylphenyl)pentaerythritol-diphosphite and tetrakis(2,6-di-tert-butylphenyl)4,4'-biphenylene phosphite are preferably used.

The thioether-based compounds include dilauryl thiodipropionate, ditridecyl thiodipropionate, dimyristyl thiodipropionate, distearyl thiodipropionate, pentaerythritol-tetrakis(3-laurylthiopropionate), pentaerythritol-tetrakis(3-dodecylthiopropionate), pentaerythritol-tetrakis(3-octadecylthiopropionate), pentaerythritol-tetrakis(3-myristylthiopropionate) and pentaerythritol-tetrakis(3-stearylthiopropionate).

The light stabilizers include benzophenone-based compounds, benzotriazole-based compounds, aromatic benzoate-based compounds, oxalic acid anilide-based compounds, cyanoacrylate-based compounds and hindered amine-based compounds.

The benzophenone-based compounds include benzophenone, 2,4-dihydroxybenzophenone, 2,2'-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-octoxybenzophenone, 2-hydroxy-4-dodecyloxybenzophenone, 2-hydroxy-4-octoxybenzophenone, 2-hydroxy-4-methoxy-5-sulfobenzophenone, 5-chloro-2-hydroxybenzophenone, 2-hydroxy-4-octoxybenzophenone, 2-hydroxy-4-methoxy-2'-carboxybenzophenone and 2-hydroxy-4-(2-hydroxy-3-methyl-acryloxyisopropoxy)benzophenone.

The benzotriazole-based compounds include 2-(5-methyl-2-hydroxyphenyl)benzotriazole, 2-(3,5-di-tert-butyl-2-hydroxyphenyl)benzotriazole, 2-(3,5-di-tert-amyl-2-hydroxyphenyl)benzotriazole, 2-(3',5'-di-tert-butyl-4'-methyl-2'-hydroxyphenyl)benzotriazole, 2-(3,5-di-tert-amyl-2-hydroxyphenyl)-5-chlorobenzotriazole, 2-(5-tert-butyl-2-hydroxyphenyl)benzotriazole, 2-[2'-hydroxy-3',5'-bis(α,α-dimethylbenzyl)phenyl]benzotriazole, 2-[2'-hydroxy-3',5'-bis(α,α-dimethylbenzyl)phenyl]-2H-benzotriazole and 2-(4'-octoxy-2'-hydroxyphenyl) benzotriazole.

The aromatic benzoate-based compounds include alkylphenyl salicylates such as p-tert-butylphenyl salicylate and p-octylphenyl salicylate.

The oxalic acid anilide-based compounds include 2-ethoxy-2'-ethyloxalic acid bisanilide, 2-ethoxy-5-tert-butyl-2'-ethyloxalic acid bisanilide and 2-ethoxy-3'-dodecyloxalic acid bisanilide.

The cyanoacrylate-based compounds include ethyl-2-cyano-3,3'-diphenyl acrylate and 2-ethylhexyl-cyano-3,3'-diphenyl acrylate.

The hindered amine-based compounds include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-octadecyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl) malonate, bis(2,2,6,6-tetramethyl-4-piperidyl)sebacate, bis (2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-tert-butyl-4-hydroxyphenyl)propionyloxy}-2,2,6,6-tetramethylpiperidine, and condensate of 1,2,3,4-butanetetracarboxylic acid, 1,2,2,6,6-pentamethyl-4-piperidinol and β,β,β',β'-tetramethyl-3,9-[2,4,8,10-tetraoxaspiro(5,5) undecane]dimethanol. In the present invention, the stabilizer components may be used alone or in combination of two or more. Hindered phenol-based compounds and/or benzotriazole-based compounds are preferred as the stabilizer component.

The content of the stabilizer is preferably 0.01 to 3 parts by mass, more preferably 0.03 to 2 parts by mass based on 100 parts by mass of the aromatic polyester resin (component A).

<Crystallization Accelerator>

The resin composition of the present invention may comprise an organic or inorganic crystallization accelerator. When the resin composition comprises a crystallization accelerator, a molded article which is excellent in mechanical properties, heat resistance and moldability can be obtained.

That is, moldability and crystallinity are improved by using a crystallization accelerator, thereby making it possible to obtain a molded article having excellent heat resistance and moist heat-resistant stability through sufficient crystallization during normal injection molding. In addition, the production time of the molded article can be greatly shortened, with the result that an economical effect can be great.

Crystallization nucleating agents which are generally used for crystalline resins may be used as the crystallization accelerator used in the present invention, and both inorganic and organic crystallization nucleating agents may be used.

The inorganic crystallization nucleating agents include talc, kaolin, silica, synthetic mica, clay, zeolite, graphite, carbon black, zinc oxide, magnesium oxide, titanium oxide, calcium carbonate, calcium sulfate, barium sulfate, calcium sulfide, boron nitride, montmorillonite, neodymium oxide, aluminum oxide and phenyl phosphate metal salts. Preferably, these inorganic crystallization nucleating agents are treated with a dispersion aid to enhance their dispersibilities in the composition and their effects so as to be well dispersed to a primary particle diameter of 0.01 to 0.5 μm.

The organic crystal nucleating agents include organic carboxylic acid metal salts such as calcium benzoate, sodium benzoate, lithium benzoate, potassium benzoate, magnesium benzoate, barium benzoate, calcium oxalate, disodium terephthalate, dilithium terephthalate, dipotassium terephthalate, sodium laurate, potassium laurate, sodium myristate, potassium myristate, calcium myristate, barium myristate, sodium octanoate, calcium octanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, sodium β-naphthoate, potassium β-naphthoate and sodium cyclohexane carboxylate, and organic sulfonic acid metal salts such as sodium p-toluene sulfonate and sodium sulfoisophthalate.

Organic carboxylic acid amides such as stearic acid amide, ethylene bislauric acid amide, palmitic acid amide, hydroxystearic acid amide, erucic acid amide and trimesic acid tris(tert-butylamide), low-density polyethylene, high-density polyethylene, polyisopropylene, polybutene, poly-4-methylpentene, poly-3-methylbutene-1, polyvinyl cycloalkane, polyvinyl trialkylsilane, high-melting point polylactic acid, sodium salts of an ethylene-acrylic acid copolymer, sodium salts of a styrene-maleic anhydride copolymer (so-called "ionomers"), benzylidene sorbitol and derivatives thereof such as dibenzylidene sorbitol are also included.

Out of these, at least one selected from talc and organic carboxylic acid metal salts is preferably used. The crystallization accelerators may be used alone or in combination of two or more in the present invention.

The content of the crystallization accelerator is preferably 0.01 to 30 parts by mass, more preferably 0.05 to 20 parts by mass based on 100 parts by mass of the aromatic polyester resin (component A).

<Filler>

The resin composition of the present invention may comprise an organic or inorganic filler. When the resin composition comprises a filler component, a molded article having excellent mechanical properties, heat resistance and moldability can be obtained.

Examples of the organic filler include chip fillers such as rice husk chips, wooden chips, bean curd refuse, old paper crushed chips and apparel crushed chips, fibrous fillers such as plant fibers including cotton fibers, hemp fibers, bamboo fibers, wooden fibers, kenaf fibers, jute fibers, banana fibers and coconut fibers, pulp and cellulose fibers obtained from these plant fibers, animal fibers including silk, wool, Angora, cashmere and camel fibers, and synthetic fibers including polyester fibers, nylon fibers and acrylic fibers, and powdery fillers such as paper powders, wooden powders, cellulose powders, rice husk powders, fruit shell powders, chitin powders, chitosan powders, protein powders and starch powders. From the viewpoint of moldability, paper powders, wooden powders, bamboo powders, cellulose powders, kenaf powders, rice husk powders, fruit shell powders, chitin powders, chitosan powders, protein powders and starch powders are preferred, and paper powders, wooden powders, bamboo powders, cellulose powders and kenaf powders are more preferred. Paper powders and wooden powders are much more preferred. Paper powders are particularly preferred.

Organic fillers directly obtained from natural products may be used but organic fillers recycled from waste materials such as used paper, waste timber and used clothing may also be used.

Conifers such as yellow pine, cedar, cypress and fir, and broadleaf trees such as beech, chinquapin and eucalyptus are preferred as timber.

Paper powders preferably contain an adhesive, especially an emulsion-based adhesive such as vinyl acetate resin-based emulsion or acrylic resin-based emulsion which is generally used to process paper, or a hot melt adhesive such as polyvinyl alcohol-based adhesive or polyamide-based adhesive from the viewpoint of moldability.

In the present invention, the content of the organic filler is not particularly limited but preferably 1 to 300 parts by mass, more preferably 5 to 200 parts by mass, much more preferably 10 to 150 parts by mass and particularly preferably 15 to 100 parts by mass based on 100 parts by mass of the aromatic polyester resin (component A) from the viewpoints of moldability and heat resistance. When the content of the organic filler is lower than 1 part by mass, the effect of improving the moldability of the composition becomes small and when the content is higher than 300 parts by mass, it is difficult to disperse the filler uniformly, or the strength and appearance as well as moldability and heat resistance of the composition as a material may deteriorate disadvantageously.

The composition of the present invention may comprise an inorganic filler. By mixing an inorganic filler, a composition having excellent mechanical properties, heat resistance and moldability can be obtained. The inorganic filler used in the present invention is a fibrous, lamellar or powdery filler which is generally used to reinforce an ordinary thermoplastic resin.

Examples of the inorganic filler include fibrous inorganic fillers such as carbon nanotubes, glass fibers, asbestos fibers, carbon fibers, graphite fibers, metal fibers, potassium titanate whiskers, aluminum borate whiskers, magnesium-based whiskers, silicon-based whiskers, wollastonite, imogolite, sepiolite, asbestos, slag fibers, xonotlite, gypsum fibers, silica fibers, silica-alumina fibers, zirconia fibers, boron nitride fibers, silicon nitride fibers and boron fibers, and lamellar and particulate inorganic fillers such as lamellar silicates, lamellar silicates exchanged with an organic onium ion, glass flakes, non-swellable mica, graphite, metal foils, ceramic beads, talc, clay, mica, sericite, zeolite, bentonite, dolomite, kaolin, powdery silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite and carbon nanoparticles including white clay fullerene.

The lamellar silicates include smectite-based clay minerals such as montmorillonite, beidellite, nontronite, saponite, hectorite and sauconite, clay minerals such as vermiculite, halloysite, kanemite and kenyaite, and swellable micas such as Li-fluor-taeniolite, Na-fluor-taeniolite, Li-fluor-tetra-silicic mica and Na-fluor-tetra-silicic mica. They may be natural or synthetic. Out of these, smectite-based clay minerals such as montmorillonite and hectorite, and swellable synthetic micas such as Li-fluor-taeniolite and Na-fluor-tetra-silicic mica are preferred.

Out of these inorganic fillers, fibrous or lamellar inorganic fillers are preferred, and glass fibers, wollastonite, aluminum borate whiskers, potassium titanate whiskers, mica, kaolin and cation exchanged lamellar silicates are particularly preferred. The aspect ratio of the fibrous filler is preferably 5 or more, more preferably 10 or more, much more preferably 20 or more.

The filler may be coated or bundled with a thermoplastic resin such as an ethylene-vinyl acetate copolymer or a thermosetting resin such as epoxy resin, or treated with a coupling agent such as aminosilane or epoxysilane.

The content of the inorganic filler is preferably 0.1 to 200 parts by mass, more preferably 0.5 to 100 parts by mass, much more preferably 1 to 50 parts by mass, particularly preferably 1 to 30 parts by mass and most preferably 1 to 20 parts by mass based on 100 parts by mass of the aromatic polyester resin (component A).

<Release Agent>

The resin composition of the present invention may comprise a release agent. As the release agent used in the present invention may be used a release agent which is used for ordinary thermoplastic resins.

Examples of the release agent include fatty acids, fatty acid metal salts, oxyfatty acids, paraffins, low-molecular weight polyolefins, fatty acid amides, alkylenebis fatty acid amides, aliphatic ketones and modified silicones. When the resin composition comprises one of these release agents, a molded article having excellent mechanical properties, moldability and heat resistance can be obtained.

These release agents may be used alone or in combination of two or more. The content of the release agent is preferably 0.01 to 3 parts by mass, more preferably 0.03 to 2 parts by mass based on 100 parts by mass of the aromatic polyester resin (component A).

<Antistatic Agent>

The resin composition of the present invention may comprise an antistatic agent. Examples of the antistatic agent include quaternary ammonium salt-based and sulfonate-based compounds such as (β-lauramidepropionyl) trimethylammonium sulfate and sodium dodecylbenzene sulfonate, and alkyl phosphate-based compounds. In the present invention, these antistatic agents may be used alone or in combination of two or more.

The content of the antistatic agent is preferably 0.05 to 5 parts by mass, more preferably 0.1 to 5 parts by mass based on 100 parts by mass of the aromatic polyester resin (component A).

<Platicizer>

The resin composition of the present invention may comprise a plasticizer. Generally known plasticizers may be used as the platicizer. The plasticizers may be used alone or in combination of two or more. The content of the platicizer is preferably 0.01 to 30 parts by mass, more preferably 0.05 to 20 parts by mass, much more preferably 0.1 to 10 parts by mass based on 100 parts by mass of the aromatic polyester resin (component A). In the present invention, a crystallization accelerator and a plasticizer may be used independently but preferably in combination.

<Impact Resistance Improver>

The resin composition of the present invention may comprise an impact resistance improver. The impact resistance improver is not particularly limited as long as it can be used to improve the impact resistance of a thermoplastic resin. For example, at least one selected from the following impact resistance improver may be used.

Specific examples of the impact resistance improver include ethylene-propylene copolymer, ethylene-propylene-nonconjugated diene copolymer, ethylene-butene-1 copolymer, acrylic rubbers, ethylene-acrylic acid copolymer and alkali metal salts thereof (so-called "ionomers"), ethylene-glycidyl (meth)acrylate copolymer, ethylene-acrylate copolymers (such as ethylene-ethyl acrylate copolymer and ethylene-butyl acrylate copolymer), modified ethylene-propylene copolymer, diene rubbers (such as polybutadiene, polyisoprene and polychloroprene), diene-vinyl copolymers (such as styrene-butadiene random copolymer, styrene-butadiene block copolymer, styrene-butadiene-styrene block copolymer, styrene-isoprene random copolymer, styrene-isoprene block copolymer, styrene-isoprene-styrene block copolymer, polybutadiene-styrene graft copolymer and butadiene-acrylonitrile copolymer), polyisobutylene, copolymer of isobutylene and butadiene or isoprene, natural rubber, Thiokol rubber, polysulfide rubber, polyurethane rubber, polyether rubber and epichlorohydrin rubber.

Further, impact resistance improvers having different degrees of crosslinking, impact resistance improvers having various micro-structures such as cis-structure and trans-structure, and core-shell type multi-layer polymers, each consisting of a core layer and at least one shell layer covering the core layer, and having adjacent layers made of different types of polymers, may also be used.

Even when the (co)polymers listed above are random copolymers or block copolymers, they may be used as the impact resistance improver of the present invention.

The content of the impact resistance improver is preferably 1 to 30 parts by mass, more preferably 5 to 20 parts by mass, much more preferably 10 to 20 parts by mass based on 100 parts by mass of the aromatic polyester resin (component A).

<Others>

The resin composition of the present invention may comprise a thermosetting resin such as phenolic resin, melamine resin, silicone resin or epoxy resin in limits not prejudicial to the spirit of the present invention. The resin composition of the present invention may also comprise a flame retardant such as bromine-based, phosphorus-based, silicone-based or antimony compound in limits not prejudicial to the intent of the present invention. The resin composition may further comprise a colorant including an organic or inorganic dye or pigment, for example, an oxide such as titanium dioxide, a hydroxide such as alumina white, a sulfide such as zinc sulfide, a ferrocyanide compound such as iron blue, a chromate such as zinc chromate, a sulfate such as barium sulfate, a carbonate such as calcium carbonate, a silicate such as ultramarine blue, a phosphate such as manganese violet, carbon such as carbon black, or a metal colorant such as bronze powder or aluminum powder. The resin composition may still further comprise a nitroso-based condensation polycyclic colorant such as Naphthol Green B, a nitro-based condensation polycyclic colorant such as Naphthol Yellow B, an azo-based condensation polycyclic colorant such as Naphthol Red or Chromophthal Yellow, a phthalocyanine-based condensation polycyclic colorant such as Phthalocyanine Blue or Fast Sky Blue, or Indanthrene Blue, and a slidability accelerator such as graphite or fluororesin. These additives may be used alone or in combination of two or more.

<Molded Article>

A molded article obtained from the resin composition of the present invention can be formed by injection molding, extrusion molding, vacuum or pressure molding or blow molding. Examples of the molded article include pellets, fibers, cloth, fiber structures, films, sheets and sheet nonwoven fabrics.

The melt molding method of a pellet of the resin composition of the present invention is not limited at all, and pellets produced by known pellet production methods can be advantageously used. That is, a conventionally known method in which a resin composition extruded into a strand or plate is cut in air or water after the resin is completely solidified or while it is still molten and not completely solidified can be advantageously employed in the present invention.

Injection molding is carried out at a cylinder temperature of 230 to 290° C. and a mold temperature of preferably 30 to 120° C., more preferably 40 to 110° C. from the viewpoint of crystallizing a molded article and increasing the molding cycle at the time of injection molding.

These molded articles include housings, mechanical parts such as wheels and gears, electric and electronic parts such as connectors, construction members, civil engineering members, agricultural materials, automobile parts (interior and exterior parts) and parts for daily use.

The film and sheet of the present invention are formed by conventionally known methods. For example, the film and sheet are formed by molding techniques such as extrusion molding and cast molding. That is, an unstretched film is extruded by using an extruder having a T die or circular die and further stretched and heated to be formed. The unstretched film may be directly used as a sheet. To form a film, a material obtained by melt kneading together the resin composition and the above-described components in advance may be used, or these components may be melt kneaded together at the time of extrusion molding to be formed. An unstretched film having few surface defects can be obtained by mixing an electrostatic adhesive such as a sulfonic acid quaternary phosphonium salt with the molten resin at the time of extruding the unstretched film.

Further, an unstretched film can also be cast molded by dissolving the resin composition and additive components in a common solvent such as chloroform or methylene dichloride, casting the resulting solution and drying and solidifying it.

The unstretched film may be stretched monoaxially in the mechanical flow direction or in a direction orthogonal to the mechanical flow direction. A biaxially oriented film can be produced by carrying out sequential biaxial stretching with rollers and a tenter, simultaneous biaxial stretching with a tenter, or tubular biaxial stretching. Further, the film is generally heat set after stretching so as to suppress its heat shrinkage. The stretched film obtained as described above may be optionally subjected to a surface activation treatment such as plasma treatment, amine treatment or corona treatment in accordance with a conventionally known method.

The film or sheet of the present invention may be used alone or in combination with another type of a film or sheet. When it is used in combination with another type of a film or sheet, it is assembled with a film or sheet made of another material to obtain, for example, a laminate, or with another form such as an injection molded article or a fiber structure.

EXAMPLES

The following examples are provided for the purpose of further illustrating the present invention but are in no way to be taken as limiting.

Examples 1 to 3 and Comparative Examples 1 to 5

1. Measurement values in the examples were obtained by the following methods.
(1) Identification of cyclic carbodiimide structure by NMR
The synthesized cyclic carbodiimide compound (component B) was confirmed by $^1$H-NMR and $^{13}$C-NMR. The JNR-EX270 of JEOL Ltd. was used for NMR. Heavy chloroform was used as a solvent.
(2) Identification of carbodiimide skeleton of cyclic carbodiimide (component B) by IR
The existence of the carbodiimide skeleton of the synthesized cyclic carbodiimide compound (component B) was confirmed by FT-IR at 2,100 to 2,200 cm$^{-1}$ which is the characteristic of a carbodiimide. The Magna-750 of Thermonicoley Co., Ltd. was used for FT-IR.
(3) Melt Viscosity
The melt viscosity of the resin composition was confirmed with a rheometer. The Rheometer ARES of TA Instruments was used. The melt viscosity was measured at a temperature of 260° C. and a shear rate of 1 s$^{-1}$ in a nitrogen atmosphere for 6 seconds as measurement conditions. The melt viscosity at this point was confirmed.

The melt viscosity characteristics (MV) of a pellet sample of the resin composition were measured by using Capilograph 1B (of Toyo Seiki Seisaku-sho, Ltd.) and a φ1 mm×20 mmL capillary at a furnace body temperature of 260° C. and a shear rate of 1,000 sec$^{-1}$ based on ISO11443:2005 after it was dried at 140° C. for 3 hours.
(4) Carboxyl Group Content
The resin composition was dissolved in purified o-cresol in a nitrogen stream and titrated with a 0.05 N potassium hydroxide ethanol solution by using Bromocresol Blue as an indicator.
(5) Reduced Viscosity Retention (Stability to Hydrolysis)
The reduced viscosity retention of the resin composition when it was treated at 121° C. and 100% RH (0.2 MPa) for 100 hours in a pressure cooker tester was evaluated.
The reduced viscosity ($\eta s_{p/c}$) was measured at 35° C. with an Ubbellohde viscometer by dissolving 40 mg of the sample in 10 ml of a mixed solvent of tetrachloroethane and phenol (1/1), and the reduced viscosity retention (%) was obtained from the reduced viscosity after the treatment of the sample as a numerator and the reduced viscosity before the treatment of the sample as a denominator.
(6) Existence of Generation of Isocyanate Odor
When the resin composition was melt kneaded at 250° C. for 5 minutes, sensory evaluation was made according to whether a measurer detected an isocyanate smell or not. "Not detected" means that an isocyanate smell is not detected and "detected" means that the isocyanate smell is detected.
Components A to C
(1) Aromatic Polyester Resin (Component A)
Polybutylene terephthalate manufactured by WinTech Polymer Ltd. was used (may be referred to as "(A1) hereinafter).
The reduced viscosity of the aromatic polyester resin (A1) was 0.84 dl/g (intrinsic viscosity was 0.69 dL/g). The carboxyl group content, melt viscosity and reduced viscosity retention of the aromatic polyester resin are shown in Table 1.
(2) Cyclic Carbodiimide Compound (Component B)
The cyclic carbodiimide compound (component B) was manufactured by the following method.
o-nitrophenol (0.11 mol), pentaerythritol tetrabromide (0.025 mol), potassium carbonate (0.33 mol) and 200 ml of N,N-dimethylformamide were fed to a reactor equipped with a stirrer and a heater in an N$_2$ atmosphere and reacted at 130° C. for 12 hours, DMF was removed under reduced pressure, the obtained solid was dissolved in 200 ml of dichloromethane, and the resulting solution was separated with 100 ml of water 3 times. An organic layer was dehydrated with 5 g of sodium sulfate, and dichloromethane was removed under reduced pressure to obtain an intermediate product (nitro compound).
Then, the intermediate product (nitro compound) (0.1 mol), 5% palladium carbon (Pd/C) (2 g) and 400 ml of an ethanol/dichloromethane mixed solvent (70/30) were fed to a reactor equipped with a stirrer, hydrogen substitution was carried out 5 times, and a reaction was carried out while hydrogen was always supplied at 25° C. and terminated when the amount of hydrogen did not decrease any more. Pd/C was collected, and the mixed solvent was removed to obtain an intermediate product (amine compound).
Then, triphenylphosphine dibromide (0.11 mol) and 150 ml of 1,2-dichloroethane were fed to a reactor equipped with a stirrer, a heater and a dropping funnel in an N$_2$ atmosphere and stirred. A solution obtained by dissolving the intermediate product (amine compound) (0.025 mol) and triethylamine (0.25 mol) in 50 ml of 1,2-dichloroethane was gradually added dropwise to the resulting solution at 25° C. After the end of addition, a reaction was carried out at 70° C. for 5 hours. Thereafter, the reaction solution was filtered, and the filtrate was separated with 100 ml of water 5 times. An organic layer was dehydrated with 5 g of sodium sulfate, and 1,2-dichloroethane was removed under reduced pressure to obtain an intermediate product (triphenylphosphine compound).

Thereafter, di-tert-butyl dicarbonate (0.11 mol), N,N-dimethyl-4-aminopyridine (0.055 mol) and 150 ml of dichloromethane were fed to a reactor equipped with a stirrer and a dropping funnel in an $N_2$ atmosphere and stirred. 100 ml of dichloromethane containing the intermediate product (triphenylphosphine compound) (0.025 mol) dissolved therein was gradually added dropwise to the resulting solution at 25° C. After the end of addition, a reaction was carried out for 12 hours. Thereafter, a solid obtained by removing dichloromethane was purified to obtain the following cyclic carbodiimide compound having two carbodiimide rings, each having only one carbodiimide group (B1: molecular weight of 516) as the component C. The structure of this cyclic carbodiimide compound (B1) was checked by NMR and IR.

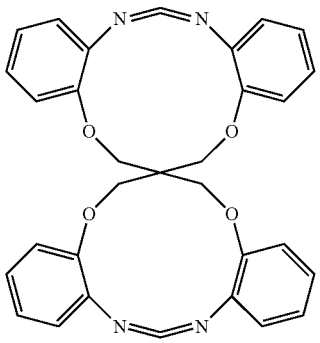 [SMILES: C1=Nc2ccccc2OCC2(COc3ccccc3N=1)COc1ccccc1N=C=Nc1ccccc1OC2]

(3) Polyvalent Hydroxyl Group-Containing Compound (Component C)

The following compounds were used as the component C.
Polyvalent hydroxyl group-containing compound (C1): pentaerythritol manufactured by Tokyo Chemical Industry Co., Ltd., hydroxyl value of 1,648
Polyvalent hydroxyl group-containing compound (C2): trimethylolethane manufactured by Tokyo Chemical Industry Co., Ltd., hydroxyl value of 1,401

Example 1

After 100 parts by mass of the aromatic polyester resin (A1) was vacuum dried at 110° C. for 5 hours, 1 part by mass of the cyclic carbodiimide compound (B1) and 1 part by mass of the polyvalent hydroxyl group-containing compound (C1) having a hydroxyl value of 200 or more were added to and melt kneaded with the above aromatic polyester resin at a resin temperature of 250° C. for 5 minutes by using Labo Plastomill (of Toyo Seiki Seisaku-sho, Ltd.) to obtain a resin composition (M1). An isocyanate smell was not detected during the production of the resin composition. The carboxyl group content, melt viscosity and reduced viscosity retention of this composition are shown in Table 1.

Example 2

A resin composition (M2) was obtained in the same manner as in Example 1 except that the amount of the polyvalent hydroxyl group-containing compound (C1) was changed from 1 part by mass to 1.5 parts by mass. An isocyanate smell was not detected during the production of the resin composition. The carboxyl group content, melt viscosity and reduced viscosity retention of this composition are shown in Table 1.

Comparative Example 1

A resin composition (M3) was obtained in the same manner as in Example 1 except that the polyvalent hydroxyl group-containing compound (C1) was not added. An isocyanate smell was not detected during the production of the resin composition. The carboxyl group content, melt viscosity and reduced viscosity retention of this composition are shown in Table 1.

Example 3

A resin composition (M4) was obtained in the same manner as in Example 1 except that the polyvalent hydroxyl group-containing compound was changed from (C1) to (C2). An isocyanate smell was not detected during the production of the resin composition. The carboxyl group content, melt viscosity and reduced viscosity retention of this composition are shown in Table 1.

Comparative Example 2

A resin composition (M5) was obtained in the same manner as in Comparative Example 1 except that the cyclic carbodiimide compound (B1) as the component B was changed to polycarbodiimide Sb—P having a linear structure (STABAXOL (registered trademark) P of Rhein Chemie Japan Ltd.). An isocyanate smell was detected during the production of the resin composition. The carboxyl group content, melt viscosity and reduced viscosity retention of this composition are shown in Table 1.

Comparative Example 3

A resin composition (M6) was obtained in the same manner as in Comparative Example 1 except that the cyclic polycarbodiimide compound (B1) as the component B was changed to polycarbodiimide LA-1 having a linear structure (Carbodilite (registered trademark) LA-1 of Nisshinbo Chemical Inc.). An isocyanate smell was detected during the production of the resin composition. The carboxyl group content, melt viscosity and reduced viscosity retention of this composition are shown in Table 1.

Comparative Example 4

A resin composition (M7) was obtained in the same manner as in Comparative Example 1 except that the cyclic carbodiimide compound (B1) as the component B was changed to monocarbodiimide Sb-I having a linear structure (STABAXOL (registered trademark) I of Rhein Chemie Japan, Ltd.). An isocyanate smell was detected during the production of the resin composition. The carboxyl group content, melt viscosity and reduced viscosity retention of this composition are shown in Table 1.

Comparative Example 5

A resin composition (M8) was obtained in the same manner as in Example 1 except that stearyl alcohol manufactured by Wako Pure Chemical Industries, Ltd. which is a primary alcohol was used in place of the polyhydric alcohol (C1) as the polyvalent hydroxyl group-containing compound having a hydroxyl value of not less than 200. An isocyanate smell was not detected during the production of the resin composition. The carboxyl group content, melt viscosity and reduced viscosity retention of this composition are shown in Table 1.

Examples 4 to 13 and Comparative Examples 6 to 15

The properties of molded products obtained from the resin compositions of the present application were checked.
1. Values in the examples were obtained by the following methods.
(1) Melt Viscosity Characteristics (MV)
A pellet sample of the resin composition was measured by using Capilograph 1B (of Toyo Seiki Seisaku-sho, Ltd.) and

TABLE 1

|  |  |  | Reference Example | Example 1 | Example 2 | Example 3 |
|---|---|---|---|---|---|---|
| Composition | Resin composition | Abbreviation | A1 | M1 | M2 | M4 |
|  | Thermoplastic aromatic polyester resin (component A) | pbw | 100 | 100 | 100 | 100 |
|  | Carbodiimide compound (component B) | Type | — | B1 | B1 | B1 |
|  |  | pbw | — | 1 | 1 | 1 |
|  | Polyvalent hydroxyl group-containing compound (component C) | type | — | C1 | C1 | C2 |
|  |  | pbw | — | 1 | 1.5 | 1 |
| Characteristic properties | Carboxyl group content | eq/ton | 26.3 | 0.0 | 0.2 | 0.1 |
|  | Melt viscosity | Pa · s | 80.5 | 95.7 | 56.7 | 113.4 |
|  | Melt viscosity characteristics (MV) Shear rate of 1000 s$^{-1}$ 260° C. | Pa · s | 109 | 122 | 87 | 138 |
|  | Reduced viscosity retention | % | 37.8 | 92.8 | 91.1 | 88.8 |
|  | Isocyanate smell |  | not detected | not detected | not detected | not detected |

|  |  |  | Comparative Example 1 | Comparative Example 2 | Comparative Example 3 | Comparative Example 4 | Comparative Example 5 |
|---|---|---|---|---|---|---|---|
| Composition | Resin composition | Abbreviation | M3 | M5 | M6 | M7 | M8 |
|  | Thermoplastic aromatic polyester resin (component A) | pbw | 100 | 100 | 100 | 100 | 100 |
|  | Carbodiimide compound (component B) | Type | B1 | Sb-P | LA-1 | Sb-I | B1 |
|  |  | pbw | 1 | 1 | 1 | 1 | 1 |
|  | Polyvalent hydroxyl group-containing compound (component C) | type | — | — | — | — | Stearyl alcohol |
|  |  | pbw | — | — | — | — | 1 |
| Characteristic properties | Carboxyl group content | eq/ton | 0.1 | 6.8 | 1.0 | 16.8 | 0.9 |
|  | Melt viscosity | Pa · s | >1000 | 112.4 | 152.9 | 75.1 | >1000 |
|  | Melt viscosity characteristics (MV) Shear rate of 1000 s$^{-1}$ 260° C. | Pa · s | >1000 | 137 | 173 | 104 | >1000 |
|  | Reduced viscosity retention | % | 99.3 | 66.1 | 52.4 | 50.6 | 85.1 |
|  | Isocyanate smell |  | not detected | detected | detected | detected | not detected | pbw: parts by weight a φ1 mm×20 mmL capillary at a furnace body temperature of 260° C. and a shear rate of 1,000 sec$^{-1}$ based on ISO11443:2005 after it was dried at 140° C. for 3 hours.

(2) Tensile Strength (TS)

A pellet sample of the resin composition was injection molded at a resin temperature of 260° C., a mold temperature of 80° C., an injection time of 15 seconds and a cooling time of 15 seconds to obtain a ISO3167:2002 tensile test specimen after it was dried at 140° C. for 3 hours and measured for its tensile strength based on ISO527-1:1993 and ISO527-2:1993. The results are shown in Table 2.

(3) Pressure Cooker Test (PCT)

The test specimen used in the tensile strength test was treated at 121° C. and 100% RH for 48 hours in a pressure cooker tester to measure its tensile strength after the treatment so as to obtain its strength retention before and after the treatment. The test results are shown in Table 2. In Table 2, "impossible" means that the test specimen could not be measured because it greatly deteriorated after PCT and was therefore broken when it was fastened to a measuring instrument at the time of measuring tensile strength.

(4) Intrinsic Viscosity

A mixed solvent of phenol and tetrachloroethane (mass ratio of 60/40) was used to measure the intrinsic viscosity of the test specimen at 35° C. by using an Ubbellohde viscometer in accordance with a commonly used method.

(5) Amount of Generated Isocyanate Gas 30 mg of a pellet sample of the resin composition was heated at 280° C. for 10 minutes in a heating furnace in a fixed air stream (100 ml/min) and the generated isocyanate gas was collected to measure the amount of the isocyanate gas by gas chromatography.

The results are shown in Table 2. The amount of the generated isocyanate gas shown in Table 2 is a value based on 1 g of the pellet sample.

(6) Existence of Occurrence of Mold Deposit (MD)

An ISO3167:2002 tensile test specimen was formed 100 times continuously by injection molding a pellet sample of the resin composition at a resin temperature of 260° C., a mold temperature of 80° C., an injection time of 15 seconds and a cooling time of 15 seconds after it was dried at 140° C. for 3 hours to observe the existence of the occurrence of MD on the mold visually. The following criteria were used. The results are shown in Table 2.

◯: MD is not observed even after 100 times or more of continuous molding

Δ: MD is observed after 11 to 99 times of continuous molding

X: MD is observed after 10 times or less of continuous molding

2. Components A to C (1) Aromatic Polyester Resin (Component A)

The same aromatic polyester resin (component A) as in Example 1 was used.

(2) Cyclic Carbodiimide Compound (Component B)

The STABAXOL (registered trademark) P400 of Rhein Chemie Japan Ltd. which is an aromatic carbodiimide compound was used as the carbodiimide compound B2 (component B) besides B1.

(3) Polyvalent Hydroxyl Group-Containing Compound (Component C)

The following compounds were used as the polyvalent hydroxyl group-containing compound (component C).

C3: glycerin mono-12-hydroxystearic acid ester (hydroxyl value of 420, Rikemal (registered trademark) HC-100 of Riken Vitamin Co., Ltd.)

C4: triglycerin stearic acid partial ester (hydroxyl value of 280, Rikemal (registered trademark) AF-70 of Riken Vitamin Co., Ltd.)

C6: decaglycerin monolaurate (hydroxyl value of 600, Poem (registered trademark) L-021 of Riken Vitamin Co., Ltd.)

C7: propylene glycol monobehenate (hydroxyl value of 145, Rikemal (registered trademark) PB-100 of Riken Vitamin Co., Ltd.)

(4) Others

The following compound was used as an antioxidant.

E1: phenol-based antioxidant, IRGANOX (registered trademark) 1010 of BASF Japan Ltd.

<Preparation of Resin Composition>

The aromatic polyester resin (A1), the cyclic carbodiimide compound (component B), the polyvalent hydroxyl group-containing compound (component C) and the antioxidant (E1) were weighed, dry blended together in a ratio shown in Table 2 and melt kneaded together by means of a twin-screw extruder (TEX-30 of The Japan Steel Works, Ltd.) at a cylinder temperature of 260° C., a screw rotation speed of 130 rpm and an extrusion rate of 12 kg/h, and the extruded molten resin in the form of a strand was cooled and cut with a pelletizer to obtain a resin composition pellet sample. Various evaluations were made on the obtained pellet sample. The results are shown in Table 2.

TABLE 2

| | Example | | | | | | | | | |
|---|---|---|---|---|---|---|---|---|---|---|
| | 4 | 5 | 6 | 7 | 8 | 9 | 10 | 11 | 12 | 13 |
| A1 | 100 | 100 | 100 | 100 | 100 | 100 | 100 | 100 | 100 | 100 |
| B1 | 1.0 | 1.0 | 1.0 | 1.0 | 1.0 | 1.0 | 1.0 | 1.0 | 1.0 | 1.0 |
| B2 | | | | | | | | | | |
| C3 | 0.5 | 1.0 | 1.5 | | | | | | | |
| C4 | | | | 0.5 | 1.0 | 1.5 | | | | |
| C1 | | | | | | | 0.5 | 1.0 | 1.5 | |
| C6 | | | | | | | | | | 1.0 |
| C7 | | | | | | | | | | |
| E1 | 0.3 | 0.3 | 0.3 | 0.3 | 0.3 | 0.3 | 0.3 | 0.3 | 0.3 | 0.3 |
| MV (Pa · s) | 220 | 170 | 110 | 410 | 320 | 170 | 120 | 80 | 10 | 140 |
| TS (MPa) | 61 | 60 | 58 | 62 | 61 | 60 | 61 | 63 | 35 | 61 |
| TS retention after PCT (%) | 95 | 95 | 98 | 98 | 97 | 96 | 94 | 90 | 85 | 96 |

TABLE 2-continued

|  | Comparative Example | | | | | | | | | |
|---|---|---|---|---|---|---|---|---|---|---|
|  | 6 | 7 | 8 | 9 | 10 | 11 | 12 | 13 | 14 | 15 |
| Amount of generated isocyanate gas (μg/g) | 0 | 0 | 0 | 0 | 0 | 0 | 0 | 0 | 0 | 0 |
| MD (visual check) | ○ | ○ | ○ | ○ | ○ | ○ | x | x | x | ○ |

| | Comparative Example | | | | | | | | | |
|---|---|---|---|---|---|---|---|---|---|---|
| | 6 | 7 | 8 | 9 | 10 | 11 | 12 | 13 | 14 | 15 |
| A1 | 100 | 100 | 100 | 100 | 100 | 100 | 100 | 100 | 100 | 100 |
| B1 | | 1.0 | 1.0 | | | | | | | |
| B2 | | | | 1.0 | | | | 1.0 | 1.0 | 1.0 |
| C3 | | | | | 1.0 | | | 1.0 | | |
| C4 | | | | | | 1.0 | | | 1.0 | |
| C1 | | | | | | | 1.0 | | | 1.0 |
| C6 | | | | | | | | | | |
| C7 | | | 1.0 | | | | | | | |
| E1 | 0.3 | 0.3 | 0.3 | 0.3 | 0.3 | 0.3 | 0.3 | 0.3 | 0.3 | 0.3 |
| MV (Pa · s) | 60 | 650 | 620 | 110 | 30 | 40 | 10 | 60 | 80 | 50 |
| TS (MPa) | 62 | 63 | 59 | 62 | 60 | 61 | 28 | 59 | 60 | 61 |
| TS retention after PCT (%) | 37 | 106 | 101 | 104 | 44 | 47 | Impossible | 98 | 97 | 92 |
| Amount of generated isocyanate gas (μg/g) | 0 | 0 | 0 | 478 | 0 | 0 | 0 | 456 | 462 | 449 |
| MD (visual check) | ○ | ○ | ○ | ○ | ○ | ○ | x | ○ | ○ | x |

Examples 14 and 15 and Comparative Example 16

(1) Aromatic Polyester Resin (Component A)

Polyethylene terephthalate (FK-OM) manufactured by Teijin Limited (may be referred to as "A2" hereinafter) was used as the aromatic polyester resin (component A).

The aromatic polyester resin (A2) had an intrinsic viscosity of 0.63 dL/g (reduced viscosity of 0.85 dl/g) and a carboxyl group content of 15 eq/ton. Its melt viscosity and reduced viscosity retention are shown in Table 3. When A2 was used as the component A, its melt viscosity was measured at 280° C.

(2) Cyclic Carbodiimide Compound (Component B)

The above B1 was used as the carbodiimide compound (component B).

(3) Polyvalent Hydroxyl Group-Containing Compound (Component C)

The following compounds were used as the polyvalent hydroxyl group-containing compound (component C).

C1: pentaerythritol (hydroxyl value of 1,645, manufactured by Kanto Chemical Co., Inc.)

C3: glycerin mono-12-hydroxystearic acid ester (hydroxyl value of 420, Rikemal (registered trademark) HC-100 of Riken Vitamin Co., Ltd.)

<Preparation of Resin Composition>

The aromatic polyester resin (A2), the cyclic carbodiimide compound (B1) and the polyvalent hydroxyl group-containing compound (component C) were weighed in ratios shown in Table 3 and melt kneaded together by means of Labo Plastomill (of Toyo Seiki Seisaku-sho, Ltd.) at a resin temperature of 280° C. for 5 minutes to obtain resin compositions (Examples 14 and 15 and Comparative Example 16). An isocyanate smell was not detected during the production of the resin compositions. The carboxyl group contents, melt viscosities and reduced viscosity retentions of the compositions are shown in Table 3.

TABLE 3

| | | | Reference Example | Examples | | Comparative Examples |
|---|---|---|---|---|---|---|
| | | | | 14 | 15 | 16 |
| Composition | A2 | pbw | 100 | 100 | 100 | 100 |
| | B1 | pbw | — | 1 | 1 | 1 |
| | C3 | pbw | — | 1.5 | — | — |
| | C1 | pbw | — | — | 1 | — |
| Characteristic properties | Carboxyl group content | eq/ton | 15 | 1.4 | 0.8 | 1.6 |
| | MV | Pa · s | 43.8 | 28 | 25 | 434 |
| | Reduced viscosity retention | % | 37 | 56 | 62 | 52 |
| | Isocyanate smell | | Not detected | Not detected | Not detected | Not detected | pbw: parts by weight

The invention claimed is:

1. A resin composition comprising:
   (A) an aromatic polyester resin having a terminal carboxyl group content of not more than 30 eq/ton (component A),
   (B) a cyclic carbodiimide compound having at least two carbodiimide rings, each having only one carbodiimide group (component B), and
   (C) a polyvalent hydroxyl group-containing compound which is at least one selected from the group consisting of a glycerin fatty acid ester and an ether obtained by addition polymerizing alkylene oxide with diglycerin, and having a hydroxyl value of not less than 200 mg KOH/g (component C), wherein the content of the component B is 0.5 to 1.5 parts by mass based on 100 parts by mass of the component A, wherein the content of the component C is 0.5 to 1.0 part by mass based on 100 parts by mass of the component A, and wherein the component C has a hydroxyl value of not more than 600 mg KOH/g.

2. The resin composition according to claim 1, wherein the component A contains polybutylene terephthalate in an amount of not less than 50 mass %.

3. The resin composition according to claim 1, wherein the component B is a cyclic carbodiimide compound having a plurality of carbodiimide rings bonded thereto through a spiro bond or a bond group.

4. The resin composition according to claim 1, wherein the component B is a cyclic carbodiimide compound represented by the following formula:

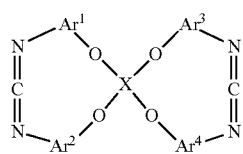

(i)

wherein in the above formula, X is a tetravalent group represented by the following formula (i-1), and $Ar^1$ to $Ar^4$ are each independently an orthophenylene group or 1,2-naphthalene-diyl group which may be substituted by a substituent;

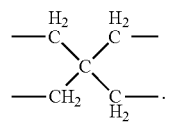

(i-1)

5. The resin composition according to claim 1 which has a terminal carboxyl group content of not more than 5 eq/ton.

6. The resin composition according to claim 1 which has a melt viscosity at 280° C. of not more than 300 Pa·s and a reduced viscosity retention of not less than 50% after it is kept for 100 hours in a 121° C., 100% RH (0.2 MPa) pressure cooker test.

7. The resin composition according to claim 2 which has a melt viscosity at 260° C. of not more than 300 Pa·s and a reduced viscosity retention of not less than 80% after it is kept for 100 hours in a 121° C., 100% RH (0.2 MPa) pressure cooker test.

8. A method of producing a resin composition which comprises:
(A) an aromatic polyester resin having a terminal carboxyl group content of not more than 30 eq/ton (component A),
(B) a cyclic carbodiimide compound having at least two rings, each having only one carbodiimide group (component B), and
(C) a polyvalent hydroxyl group-containing compound which is at least one selected from the group consisting of a glycerin fatty acid ester and an ether obtained by addition polymerizing alkylene oxide with diglycerin, and having a hydroxyl value of not less than 200 mg KOH/g (component C),
wherein the content of the component B is 0.5 to 1.5 parts by mass based on 100 parts by mass of the component A,
wherein the content of the component C is 0.5 to 1.0 part by mass based on 100 parts by mass of the component A, and
wherein the component C has a hydroxyl value of not more than 600 mg KOH/g, comprising the step of:
(i) melt kneading together the aromatic polyester resin (component A) and the polyvalent hydroxyl group-containing compound (component C) and then adding and melt kneading the cyclic carbodiimide compound (component B) with the obtained mixture; or
(ii) adding the cyclic carbodiimide compound (component B) and the polyvalent hydroxyl group-containing compound (component C) to the aromatic polyester resin (component A) at the same time and melt kneading them together.

9. A molded article formed from the resin composition of claim 1.

* * * * *